(12) United States Patent
Hobbs (10) Patent No.: US 8,787,460 B1
(45) Date of Patent: Jul. 22, 2014

(54) METHOD AND APPARATUS FOR MOTION VECTOR ESTIMATION FOR AN IMAGE SEQUENCE

(75) Inventor: David Victor Hobbs, Surrey (CA)

(73) Assignee: Teradici Corporation, Burnaby, British Columbia (CA)

( * ) Notice: Subject to any disclaimer, the term of this patent is extended or adjusted under 35 U.S.C. 154(b) by 1404 days.

(21) Appl. No.: 11/880,992

(22) Filed: Jul. 25, 2007

Related U.S. Application Data

(63) Continuation-in-part of application No. 11/532,865, filed on Sep. 18, 2006, now Pat. No. 7,822,278, which is a continuation-in-part of application No. 11/333,955, filed on Jan. 17, 2006, now Pat. No. 7,747,086.

(60) Provisional application No. 60/820,250, filed on Jul. 25, 2006, provisional application No. 60/719,050, filed on Sep. 20, 2005, provisional application No. 60/726,418, filed on Oct. 12, 2005, provisional application No. 60/703,767, filed on Jul. 28, 2005.

(51) Int. Cl.
H04N 7/12 (2006.01)
H04N 11/02 (2006.01)
H04N 11/04 (2006.01)

(52) U.S. Cl.
USPC .................................................... 375/240.16

(58) Field of Classification Search
USPC .................................................... 375/240.16
See application file for complete search history.

(56) References Cited

U.S. PATENT DOCUMENTS

| | | | | |
|---|---|---|---|---|
| 5,347,312 | A * | 9/1994 | Saunders et al. | 348/443 |
| 6,269,484 | B1 * | 7/2001 | Simsic et al. | 725/151 |
| 6,983,020 | B2 * | 1/2006 | Christiansen | 375/240.16 |
| 7,171,444 | B2 * | 1/2007 | Deshpande | 709/203 |
| 7,822,278 | B1 * | 10/2010 | Hobbs et al. | 382/232 |
| 8,120,659 | B2 * | 2/2012 | Li et al. | 348/208.4 |
| 2003/0179951 | A1 * | 9/2003 | Christiansen | 382/278 |
| 2007/0064805 | A1 * | 3/2007 | Carrig et al. | 375/240.16 |
| 2009/0237516 | A1 * | 9/2009 | Jayachandra et al. | 348/208.4 |

OTHER PUBLICATIONS

Fast Motion Vector Search for Overlapped Block Motion Compensation (OBMC); Tien-Ying Kuo, Junavit Chalidabhongse and C.-C. Ja y Kuo; 1058-6393/97 $10.00 0 1997 IEEE.*
Christiansen, Bernd Oliver et al., "Fast Motion Detection for Thin Client Compression,"*Proceedings of the Data Compression Conference* (DCC'02), © 2000 IEEE.
Schmidt, Brian K. et al., "The interactive performance of SLIM: a stateless, thin-client architecture," *17th ACM Symposium on Operating Systems Principles* (SOSP'99), Published as *Operating Systems Review*, 34(5):32-47, Dec. 1999.

* cited by examiner

*Primary Examiner* — Luu Pham
*Assistant Examiner* — James Turchen
(74) *Attorney, Agent, or Firm* — Moser Taboada (57) ABSTRACT

A method and apparatus for motion vector estimation for a plurality of image frames including retrieving a reference hash value associated with a reference frame, wherein the reference hash value represents a spatially oriented block of pixels, generating a plurality of image hash values including a first hash value for a first area represented by a spatially oriented block of pixels of an image frame and computing a motion vector estimate using a plurality of first hash values and the reference hash value is disclosed.

16 Claims, 10 Drawing Sheets

METHOD AND APPARATUS FOR MOTION VECTOR ESTIMATION FOR AN IMAGE SEQUENCE

CROSS-REFERENCE TO RELATED APPLICATIONS

This application claims benefit of U.S. provisional patent application Ser. No. 60/820,250, filed Jul. 25, 2006 and this application is a continuation-in-part of U.S. patent application Ser. No. 11/532,865, entitled "Methods and Apparatus for Encoding a Digital Video Signal" filed Sep. 18, 2006, now U.S. Pat. No. 7,822,278, issued on Oct. 26, 2010, which claims the benefit of U.S. Provisional Patent Application Ser. No. 60/719,050, filed Sep. 20, 2005, and the benefit of U.S. Provisional Patent Application Ser. No. 60/726,418, filed Oct. 12, 2005, application Ser. No. 11/532,865 is also a continuation-in-part of U.S. patent application Ser. No. 11/333,955 filed Jan. 17, 2006, now U.S. Pat. No. 7,747,086, issued on Jun. 29, 2010, which claims the benefit of U.S. Provisional Patent Application Ser. No. 60/703,767, filed Jul. 28, 2005. Each of the aforementioned patent applications is herein incorporated by reference.

BACKGROUND OF THE INVENTION

1. Field of the Invention

Embodiments of the present invention generally relate to image sequence transmission. More particularly, the present invention relates to a method and apparatus for estimating motion vectors for an image sequence.

2. Description of the Related Art

There is an increasing desire in many computing environments such as enterprise or home environments to separate the display from the storage and application processing portions of a computing system, i.e., remote computing where a server provides the computational power and the user utilizes a simple client terminal. For example, the display and input devices (e.g., portions of the client terminal) may be physically located at a user's desktop while the processing and storage components of a server are situated in a remote back office location. The client terminal is connected to the processor and storage components using some method of communication. A major challenge in supporting such a remote terminal lies in the development of efficient methods for communicating display content across a band-limited network while meeting display quality and performance latency expectations associated with a standard desktop PC.

Computer display images are well suited to inter-frame compression methods because of the large redundancy in content over a display refresh cycle coupled with the bit-exact nature of the synthetic image. Moreover, in certain operations such as the dragging or scrolling of windows, bit-exact image areas simply move from one region of the display to another. As such, changes from image to image within a sequence are determined by various image comparison techniques. For example, existing motion detection methods search a reference image for features located on a subsequent input image. Such feature detection is computational expensive due to a need to swap areas of reference image in and out of memory for comparison purposes. To improve computation speed, these comparison techniques are optimized for identifying short motion vectors by limiting a search area used for comparison.

Thin Client Compression Motion (TCC-M) estimation enables the calculation of long motion vectors by preprocessing images to allow large search areas with relatively less computation. The preprocessing represents image features as hash codes. The comparison process compares hash codes assigned to image features in an updated image region with hash codes assigned to features of a previous reference image, requiring a feature identification filter to scan the updated image and tables of hash values that locate the features. TCC-M is typically implemented in asynchronous image update applications where the search can be constrained to regions of the display that are known to have been updated since the previous update cycle, such as frame buffer transfer applications where updates are tracked by hardware registers. However, in a rasterized image processing application, the entire image would need to be characterized on each frame, making feature analysis computationally expensive.

Therefore, there is a need for a method and apparatus for motion vector estimation for image sequences in a digital raster stream.

SUMMARY OF THE INVENTION

Embodiments of the present invention include a method and apparatus for motion vector estimation for a plurality of image frames including retrieving a reference hash value associated with a reference frame, wherein the reference hash value represents a spatially oriented block of pixels, generating a plurality of image hash values including a first hash value for a first area represented by a spatially oriented block of pixels of an image frame and computing a motion vector estimate using a plurality of first hash values and the reference hash value.

Embodiments of the invention further include a remote computing system including a motion vector estimator for computing a motion vector estimate using a hash value representation of a spatially oriented block of pixels of a reference frame and a hash value representation of spatially oriented and spatially overlapping blocks of pixels of the image frame, an image encoder to encode the image frame using a confirmed motion vector estimate and a downstream external system of a client coupled with the image encoder, the downstream external system to use the confirmed motion vector estimate to decode and display the image frame.

Embodiments of the invention further include an apparatus for encoding an image frame including a hash module for retrieving a reference hash value associated with a reference frame, wherein the reference hash value represents a spatially oriented block of pixels and generating a plurality of image hash values from an image frame having a number of spatially oriented and spatially overlapping blocks of pixels and a motion vector estimator for computing a motion vector estimate using the plurality of image hash values and the reference hash value.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following detailed description of various embodiments of the present invention, motion estimation methods for an image sequence, numerous specific details are set forth to provide a more thorough description of embodiments of the invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

The described system and method generate motion vector estimates for use by a downstream process such as an encoding process where the motion vector estimate may be used as input data in the encoding of an image frame. It will be apparent to those skilled in the art that in such a case, the availability of estimation information reduces traditional motion vector processing by significantly constraining search requirements. In applications such as computer display output image compression, motion vector estimation is desirable to provide an ability to calculate new vector estimates for each scan of a digitized raster stream.

Figure 1:
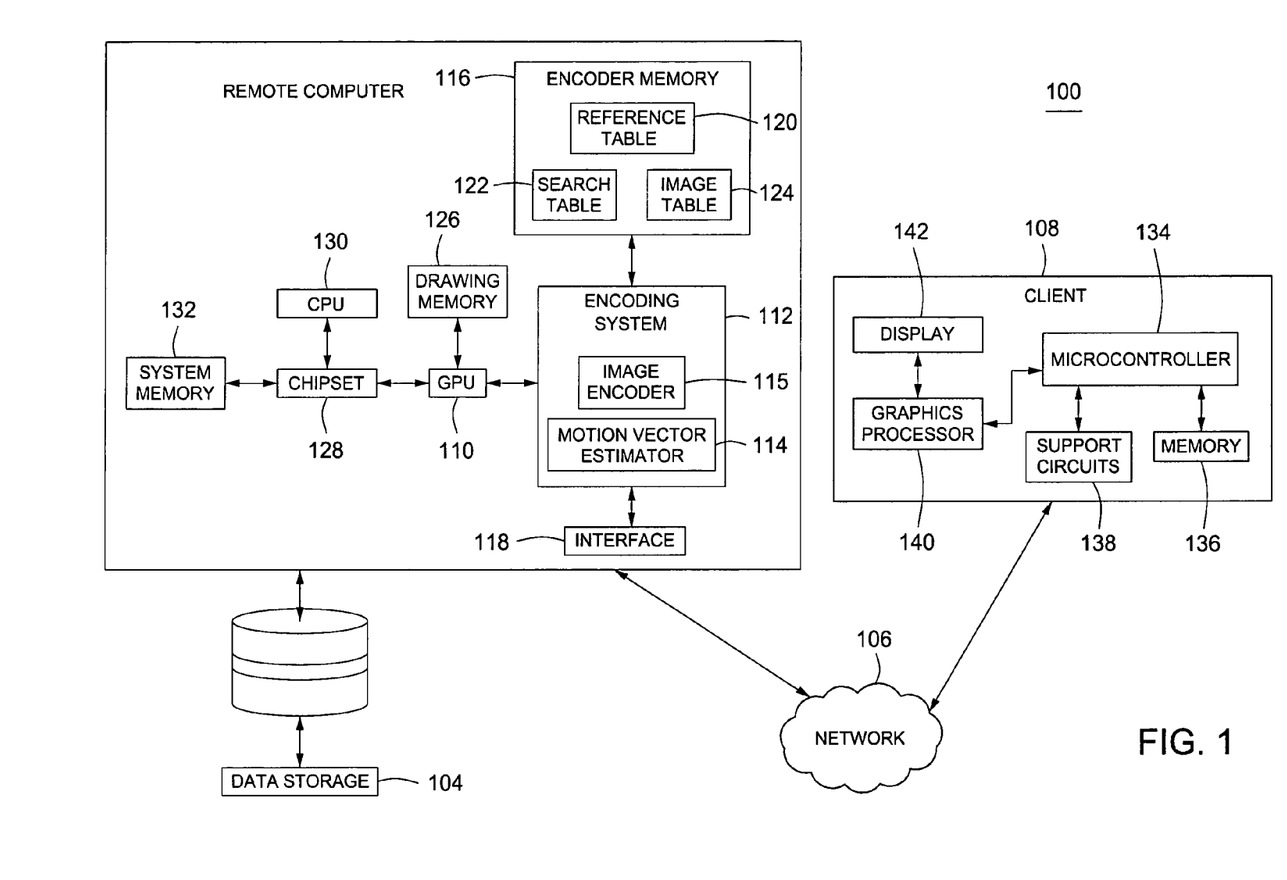
FIG. 1 is a block diagram of an exemplary embodiment of a remote computing system wherein one embodiment of the invention may find use.

FIG. 1 is a block diagram of an exemplary embodiment of a remote computing system 100. In one embodiment, the remote computing system 100 includes a remote computer 102 and a client terminal 108, each coupled to a network 106. This figure only portrays one variation of the myriad of possible network configurations. For example, the system 100 may comprise numerous remote computers 102 or several client terminals 108. For simplicity and clarity, only one remote computer 102 and only one client terminal 108 are depicted and described. Embodiments of the invention, as shall be discussed below, include a method and apparatus for motion vector estimation for an image sequence. In one embodiment, the invention enables a display of remote images on a client computer 108 in real-time.

The network 106 comprises a communication system (e.g., the Internet, LAN, WAN, and the like) that connects computer system completely by wire, cable, fiber optic, and/or wireless links facilitated by various types of well-known network elements, such as hubs, switches, routers, and the like. The network 106 may employ various well-known protocols to communicate information amongst the network resources. For example, the network 106 may be part of the Internet.

The remote computer 102 is, generally, a computer or system of computers that has been designated for running user software applications and providing computing services on the network 106. For example, the remote server 102, through the network 106, supplies the client terminal 108 with a Graphical User Interface (GUI) for application software resident on computer 102.

The client terminal 108 is any form of computing device that can display image data and connect to the network 106. For example, the client terminal 108 may be a terminal in a networked computer system (e.g., remote computing system 100). Such client terminals include thin clients, personal computers, workstations, personal digital assistants (PDAs), wireless devices, or the like. In one embodiment of the present invention, the client terminal 108 displays the sequence of images from the remote computer 102 through the network 106

The client terminal 108 is also coupled to a processor 134, a memory 136, various support circuits 138, a graphics processor 140, and a display 142. The processor 134 is an integrated circuit such as a microcontroller or a microprocessor known in the art. Since, in a remote computing system, the client terminal 108 is relieved of significant computation functions, the processor 134 is generally a microcontroller that facilities Input/Output processing, display creation, and communication with the network 106.

The memory 136 is sometimes referred to as main memory and may be used as cache memory or buffer memory. The memory 136 may comprise random access memory, read only memory, removable disk memory, flash memory, and various combinations of these types of memory. The memory 136 stores various drivers and software used by the processor 134.

The support circuits 138 may include cache, power supplies, clock circuits, data registers, I/O interfaces, network interfaces, and the like. The support circuits 138 support the functionality of the processor 134.

The graphics processor 140 may be any component for decoding graphical images. The graphics processor 140 may be an independent circuit (as depicted) or may be a portion of the processor 134. In either instance, the graphics processor 140 is provided image information comprising motion vectors and other encoded information such as a transform encoded image information that are converted to, for example, raster-scan images for communication to the display 142 using a suitable display connection such as VGA or Digital Visual Interface (DVI). The display 142 may be any screen type device (e.g., cathode ray tube (CRT), plasma display, liquid crystal display, and the like) that displays images.

In one embodiment of the present invention, remote computer 102 renders an image that is responsive to a display update initiated by CPU 130, encodes the image, and sends the encoded image through the network to the client terminal 108 for display.

The remote computer 102 comprises a graphics processing unit (GPU) 110 and an encoding system 112. The GPU 110 may also be known as a Visual Processing Unit (VPU). In one embodiment, the GPU 110 is a dedicated graphics rendering device usually coupled to CPU 130 by a bus such as Accelerated Graphics Port (AGP) or a PCI-Express bus. It is well understood in the art that the descriptive term "dedicated" means the device has its own memory (e.g., a drawing memory 126) and, therefore, may not use the system memory (e.g., RAM). In other embodiments, the GPU 110 may cooperate with, a chipset 128, a CPU (Central Processing Unit) 130, a system memory 132, and the like to facilitate efficient image rendering. The GPU 110 executes graphics instructions issued by CPU 130 in order to offload graphics processing from the CPU 130.

The encoding system 112 encodes the images produced by the GPU 110 such that the encoded images are compressed and suitable for transmission through a band-limited network, such as network 106. The encoding system 112 includes a motion vector estimator 114 and an image encoder 115 that encodes the raster display images generated by GPU 110. In one embodiment, the motion vector estimator 114 may be a preprocessing module upstream from the image encoder 115. In another embodiment, the motion vector estimator 114 performs motion vector estimation while the image encoder 115 performs image encoding using block motion compensation, transformation, encoding methods such as lossy or lossless Discrete Cosine Transform, Discrete Wavelet Transform or hybrid methods optimized for the compression of synthetic computer-generated display images and entropy encoding such as Golomb coding, variable length coding (VLC), context-adaptive VLC, context-adaptive binary arithmetic coding (CABAC) and the like. One such embodiment of an image encoder suited to computer-generated display encoding of images generated by a GPU is disclosed in commonly assigned U.S. patent application Ser. No. 11/333,955 entitled "Methods and Apparatus for Encoding a Shared Drawing Memory" filed on Jan. 17, 2006, which is incorporated herein by reference in its entirety.

In another embodiment, encoding system 112 compiles encoded image stream comprising encoded pixels describing new image portions (e.g., encoded image stream describing an image areas recently drawn by GPU 110) and motion vectors describing updated image regions where pixel areas of a previous frame have changed location (e.g., a dialog window dragged from one region of a display to another).

The encoding system 112 cooperates with an encoder memory 116 and an interface 118. The encoder memory 116 stores various tables used to perform motion estimation, including a reference Cyclic Redundancy Check (CRC) table 120, a search table 122, and an image Cyclic Redundancy Check (CRC) table 124. In one embodiment, the encoder memory 116 may store processor-executable instructions for software comprising a motion vector estimator 114.

In operation, whenever the GPU 110 renders a new or updated image, the updated image is communicated to the encoding system 112. Rather than send the entire new image through the network 106, the encoding system 112 utilizes a unique process (described below) to generate a motion vector or vectors that are transmitted to the client terminal 108. The client terminal 108 generates an updated image by copying or moving one or more regions of a previously communicated image to location(s) on the updated image specified by the vector(s). Consequently, to generate images at the client terminal 108, substantially less data is sent via the network 106 than if the entire new image were transmitted.

Figure 2:
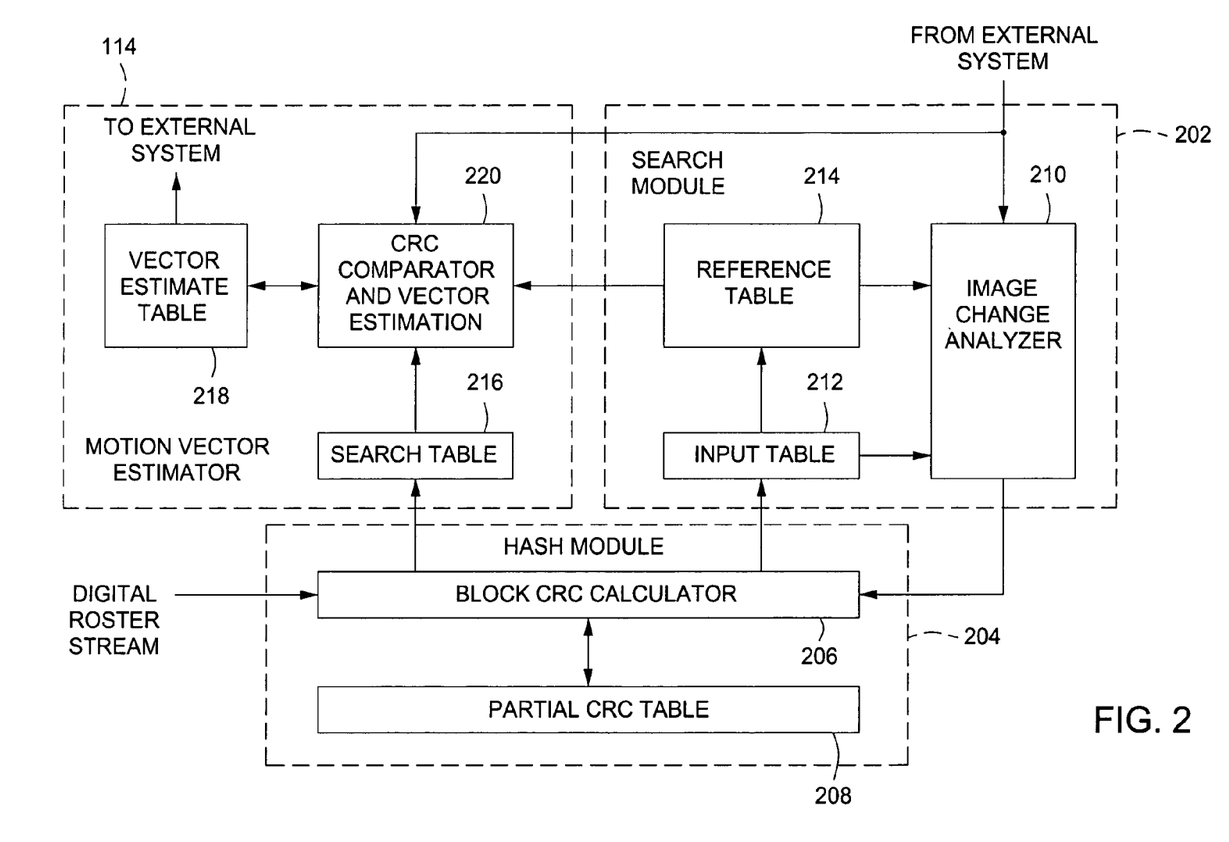
FIG. 2 is a block diagram of an exemplary embodiment of an apparatus for encoding an image including a motion vector estimator comprising an embodiment of the present invention.

FIG. 2 is a block diagram of an exemplary embodiment of an apparatus 200 for encoding an image including the motion vector estimator 114. The apparatus 200 for encoding an image further includes a search module 202, and a hash module 204, coupled to each other through transmission mediums (e.g., signal paths, wires, etc.). The apparatus 200 for encoding an image may be implemented in hardware, software or a combination of both, such as an Application Specific Integrated Circuit (ASIC), Field Programmable Gate Array (FPGA), or similar hardware circuit implementation or software implementation such as an embedded software module executing on a real-time processor or computer program executing on a standard PC.

The hash module 204 includes a block CRC calculator 206 that is also coupled to a partial CRC table 208. The hash module 204 receives bitmapped image data (e.g. pixels) as input and generates block CRC values for spatially-oriented blocks of pixels. In one embodiment, the block CRC calculator may perform raster line scanning and produce a number of hash values for each line scanned. In one embodiment, a digital raster stream is intercepted by block CRC calculator 206. The block CRC calculator 206 operates in conjunction with the partial CRC table 208 to generate an image CRC list for an image frame. One method for generating block hash values from a digital raster stream is described in commonly assigned U.S. patent application Ser. No. 11/532,865, filed Sep. 18, 2006, which is incorporated by reference herein in its entirety.

In one or more embodiments of the invention, the block CRC calculator 206 computes a partial CRC code for a horizontal raster line sequence of eight incoming pixels from digital raster stream (i.e., the CRC calculation is repeatedly executed and a new partial value generated as each pixel is received). Starting with the first line in a horizontal scan, a partial CRC code is calculated for the first eight pixels in the line. Once the partial code has been calculated, it is stored in the partial CRC table 208 and the block CRC calculator 206 computes and stores a new partial code for the next eight pixels in the line. This sequence is repeated until the end of the line of pixels in the scan. When the second scan line is initiated, the partial CRC code for the first eight pixels of the first line is retrieved from partial CRC table 208 and the code is updated to include the first eight pixels in the new line directly below the first line. This sequence is repeated for the rest of the second line and for all eight lines until a set of CRC codes has been computed for an image block row (i.e., a sequence of eight pixels by eight pixels blocks). Completed rows of CRC values are stored in an image table 212. CRC values are then calculated for the second row of blocks in the image and the sequence is repeated following the raster scan down and across the image until the complete image is converted into a series of codes.

In one embodiment of the invention, the image encoder 115 and the motion vector estimator 114 are utilized on images created by the GPU 110 of FIG. 1. To encode an image sequence, the CRC values are used to remove redundancy from the sequence and create motion vectors that are used to efficiently transmit a lossless representation of the image sequence. To facilitate such processing, the apparatus 200 for encoding an image comprises the search module 202 and the motion vector estimator 114. The search module 202 comprises an image change analyzer 210, an image table 212 and a reference table 214. A first image of a sequence is deemed a reference image and is encoded to create values (reference row CRC list) for the reference table 214. A second image (subsequent to the reference image) is encoded in the same manner to create CRC values (image row CRC list) for the image table 212. The image change analyzer 210 compares the image row CRC list with the reference row CRC list associated with the same row. The change analyzer 210 then determines which spatially-oriented block(s) of pixels has changed, as described below.

A candidate block to be used in motion estimation processing is determined based on the changed block(s). The candidate block is the spatially oriented block of pixels to be processed by the motion vector estimator 114. The candidate block may be spatially related to the changed block or may be one of the changed blocks. In one embodiment, the candidate block is a block that best anticipates a high quality motion vector estimate for the changed block(s).

An effective search area is selected for the candidate block based on a set of characteristics of the changed block(s). In one embodiment, the effective search area includes a subset of the changed blocks. In other embodiments, the effective search area comprises at least a portion of the candidate block of the image frame and at least one spatially-oriented block of pixels of the reference frame. For example, the effective search area includes an area being plus or minus one-half a block size of the candidate block. The motion vector estimator 114 computes a short vector (e.g., less than a block size of motion) if the area is one-half the block size of the candidate block. According to other embodiments, the motion vector estimator 114 computes a long vector (e.g., more than a block size of motion) if the area is one-half the block size larger than the candidate block. The effective search area and the candidate block are spatially related to the changed block and its corresponding block in the reference frame. The location of the effective search area and other search parameters such as search range constraints and a search method are communicated to the block CRC calculator 206. Then, the block CRC calculator 206 builds a pixel offset CRC list for one or more spatially oriented and spatially overlapping blocks of pixels, of the image frame, being offset by one or more pixels from the candidate block. In one or more embodiments, if the effective search area is constrained, such as systems with limited search capabilities, an abbreviated pixel offset CRC list is generated. As one example, eight vertically offset CRCs are used for a scroll search. As another example, eight horizontally offset CRCs are used for a pan search. As another example, a square of nine CRCs from (−1,−1) to (+1, +1) pixel row/column offsets is used to search for a dragged window.

In some embodiments, change analyzer 210 receives external information to support change analysis. For example, image content information or other hints are received from an external processing system such as the CPU 130, the GPU 110, the image encoder 115 or another component of the encoding system 112. Such information includes information about window drag or scroll commands received from the client terminal, encoding success statistics from previously used vector estimates, and the like. This information is used to improve confidence levels or limitation parameters placed on vector estimates resultant from errors associated with previous reference image transmissions.

The motion vector estimator 114 comprises a search table 216, a vector estimate table 218 and a CRC comparator/vector estimation sub-system 220. The CRC comparator/vector estimation sub-system 220 loads each pixel offset CRC list and compares the contents of the list against reference CRC values and aliased reference CRC values from the reference table 214. In one embodiment, single matches are recorded in vector estimate table 218 and multiple matches are discarded. Sub-system 220 also checks for a history of correlated matches and qualifies the vectors using confidence level tests. In some embodiments, sub-system 220 also receives external information such as encoding success statistics to assist in the determination of vector estimates to control the selection of aliased reference CRC values, search direction, search distance, and/or the like.

Once an image frame has been processed, reference table 214 is updated with the values from the image CRC list received from image table 212. Vector estimates are then forwarded to an external system such as the image encoder 115 or another component of the encoding system 112 (e.g., a vector validation function). In one embodiment, where motion vector estimator 114 generates multiple vector estimates, some or all estimates are forwarded to the image encoder 115. In one embodiment, the external system tests all areas of the image frame related to the vector estimates and generates confirmed motion vectors for those blocks that have identical content but a different location in the image frame, thereby supporting image compression.

In one embodiment, a change in image motion is recognized by identifying a change from one predominant vector estimate to another. Spurious anomaly vector estimates typically represent search errors. In one embodiment, sub-system 220 distinguishes between changes in motion and spurious estimates by delaying the step of communicating vector estimates to the external system, thereby allowing the establishment of a new predominant vector estimate.

Figure 3:
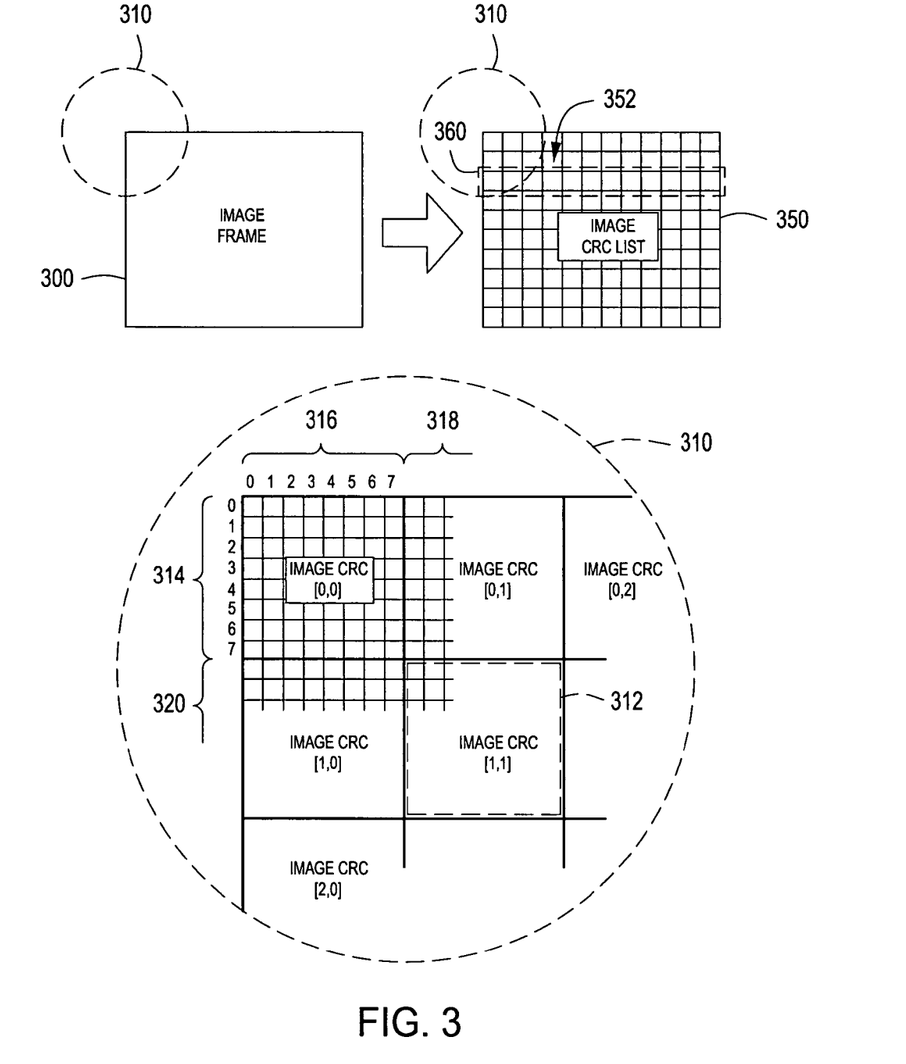
FIG. 3 is an illustration depicting exemplary embodiments of an image table and an image frame.

FIG. 3 is an illustration depicting exemplary embodiments of an image frame 300 and an image CRC list 350. The image frame 300 is a bitmapped image representation (e.g., pixels) in a digitized input raster sequence. The image frame 300 is partitioned into blocks of eight by eight pixels. The image CRC list 350 is a data structure having indices where each index indicates a location of a block of the image frame 300 that is coupled with a calculated CRC value for the block. It is well understood in the art that the method may also employ alternative coding algorithms (e.g., MD5, Secure Hash (SHA-1) in lieu of CRC, and/or any other hashing, fingerprinting or message digest coding functions that generate hash values). In one embodiment, the image frame may be partitioned into alternative shapes (e.g., rectangles and other polygons). According to another embodiment, the image frame 300 is segmented into overlapping input sections where each section is associated with an image CRC list.

The image CRC list 350 includes a block 352 (i.e., a spatially-oriented block of pixels) and a block row 360. The block 352, as mentioned above, is a CRC value for one of the eight by eight blocks of pixels of the image frame 300. The block row 360 is a row of CRC values for each of the eight by eight blocks of pixels of a row in the image frame 300. According to one embodiment, the image frame 300 is not stored by the motion vector estimator 114 and each CRC value of the image CRC list 350 is computed as the digitized input raster is captured.

The image frame 300 includes an insert 310. The insert 310 includes a portion of the image CRC list 350, a block 312, a block row 314, a block column 316, a block column 318, and a block row 320. The block row 314, as mentioned above, is the top row of blocks of the image frame 300. The block row 320 is the row of eight by eight blocks below the block row 314. The block column 316 is a first column of blocks of the image frame 300. The block column 318 is a second column of blocks of the image frame 300. Processing of the image frame 300 starts with the block row 314 and proceeds to the block row 320 and the rest of the block rows, as shown below. Selection of an effective search area includes selecting a block column, as shown below.

Figure 4:
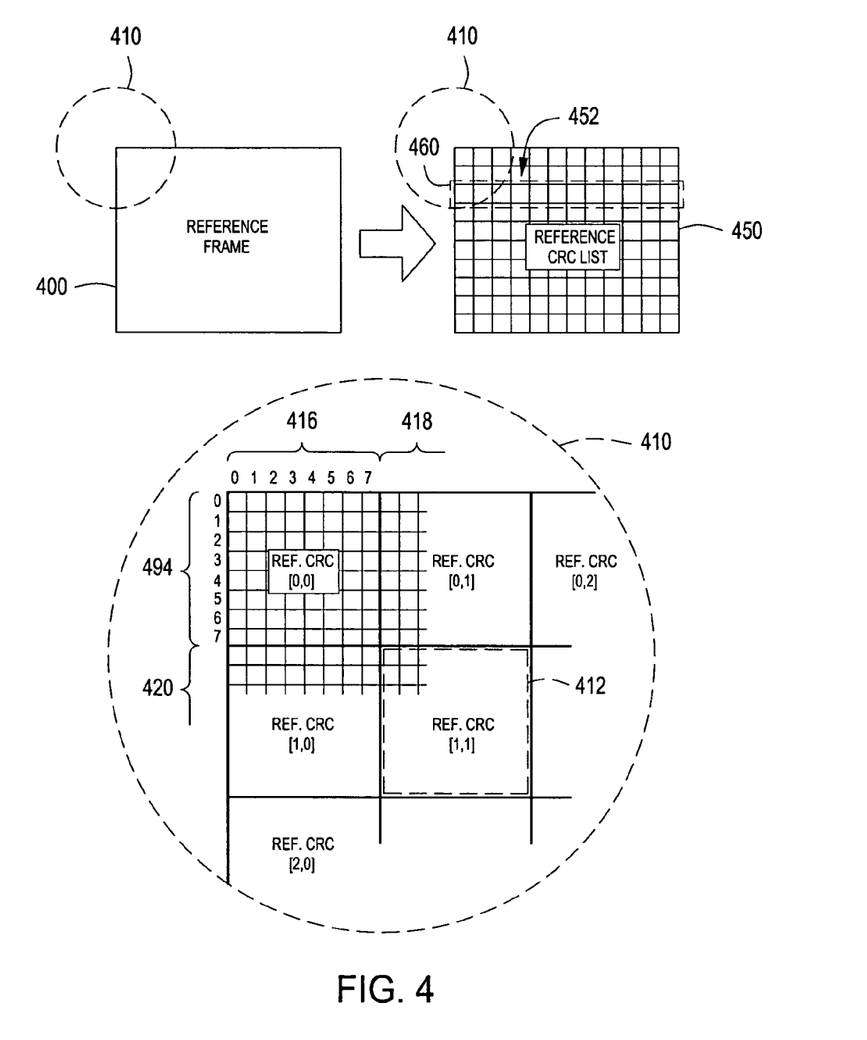
FIG. 4 is an illustration depicting exemplary embodiments of a reference table and a reference frame.

FIG. 4 is an illustration depicting exemplary embodiments of a reference frame 400 and a reference CRC list 450. The reference frame 400 is a bitmapped image representation (e.g., pixels) in a digitized input raster sequence. In one embodiment, the reference frame 400 may be a previous frame. The reference frame 400 is partitioned into eight by eight blocks of pixels. The reference CRC list 450 is a data structure having indices where each index indicates a location of a block of the reference frame 400 that is coupled with a calculated CRC value for the block.

The reference CRC list 450 includes a block 452 and a block row 460. The block 452, as mentioned above, is a CRC value for one of the eight by eight blocks of pixels of the reference frame 400. The block row 460 is a row of CRC values for each of the eight by eight blocks of pixels of a row in the reference frame 400.

The reference frame 400 includes an insert 410. The insert 410 includes a portion of the reference CRC list 450, a block 412, a block row 414, a block column 416, a block column 418, and a block row 420. The block row 414, as mentioned above, is the top row of blocks of the reference frame 400. The block row 420 is the row of eight by eight blocks below the block row 414. The block column 416 is a first column of blocks of the reference frame 400. The block column 418 is a second column of blocks of the reference frame 400. Processing of the reference frame 400 starts with the block row 414 and proceeds to the block row 420 and the rest of the block rows, as shown below.

Figure 5:
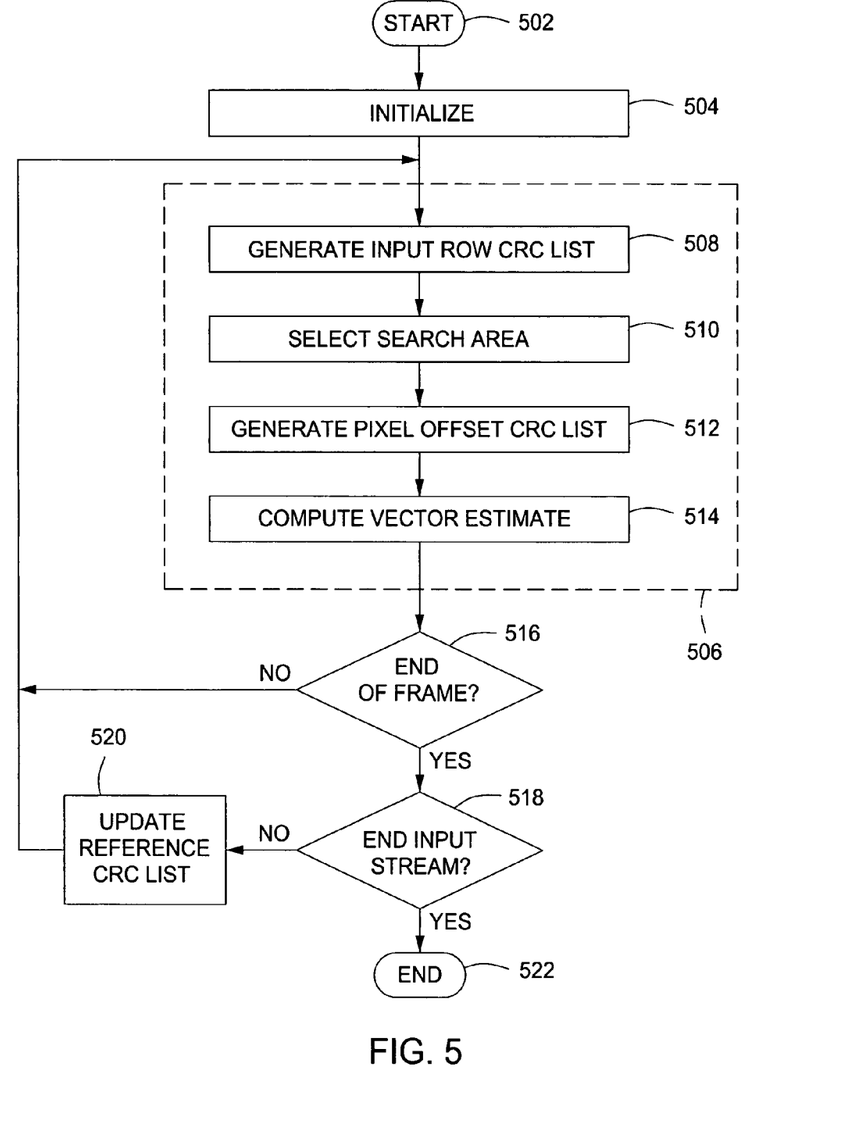
FIG. 5 is a flow diagram depicting an exemplary embodiment of a method for searching an image frame for one or more vector estimates.

FIG. 5 is a flow diagram depicting an exemplary embodiment of a method 500 for searching an image frame for one or more vector estimates. In one embodiment, the method 500 is performed in a conceptual processing pipeline where the image frame only passes through the pipeline once and image data is not stored in the pipeline.

The method 500 begins at step 502 and proceeds to step 504. At step 504, a processing pipeline is initialized. During step 504, a reference hash list for the reference frame of a frame sequence is generated. Since a first image frame has no reference hash list to support a valid search, the entire image is encoded and an image hash list is generated for the first image frame and stored as a first reference hash list. Next, the first block row (e.g., block row 314 of FIG. 3) of a second image frame is processed. An image block row hash list (e.g., image row hash list 360 of FIG. 3) is generated and subsequently compared with a reference block row hash list (e.g., reference row hash list 460 of FIG. 4). Locations of changed image blocks are determined. A block column is selected for searching and a block of the block column is selected as a candidate block based on characteristics of the changed image blocks. In one embodiment, a middle block of a largest continuous section of the changed blocks in a block row is selected as the candidate block. Since there is no historic data available for the candidate in the top row of the second image frame (e.g., the block row 314 of FIG. 3), a center block is selected.

In other embodiments, other methods for identifying changes to an image row are employed by the method 500. These methods may include algorithms for selecting the candidate block based on image content in cases where attributes related to the content are known. Then, a second block row (e.g., the block row 322 of FIG. 3) of the second frame is processed. Since each pixel offset hash list requires processing into a subsequent block row of the second image frame, generation of each pixel offset hash list concludes on the subsequent block row. A second pixel offset hash list is generated for a next candidate block of the second block row. A second image row hash list is computed and compared to corresponding hash values of the reference hash list in order to determine a candidate block for a following third block row.

At step 506, motion vector estimates are generated. In one embodiment, step 506 comprises four or more concurrent activities in the pipeline. Each activity may be performed by a separate sub-system, according to one embodiment.

Within step 506, pipeline processing activities 508, 510, 512, and 514 are performed, according to one embodiment. At activity 508, the image row hash list for the image frame is generated and used to determine which blocks in the image block row have changed. In one embodiment, the reference hash list block row (e.g. the reference hash list block row 460 of FIG. 4) is replaced with a corresponding image hash list block row (e.g., the image hash list block row 360 of FIG. 3) once a reference block row (e.g., the block rows 414 and 420 of FIG. 4) is out of a search range. In another embodiment, all updates are performed as a single operation at the end of a frame. In yet another embodiment, one or more portions of the image frame are saved locally in order to facilitate and optimize hash value computations.

At activity 510, the search area including the candidate block is selected. The image row hash list is generated, where one hash value is coupled with each block in the first block row. The image row hash list (e.g., the image row hash list 360 of FIG. 3) is compared with the reference row hash list (e.g., the reference row hash list 460 in FIG. 4) to determine locations of changed image blocks. A block column is selected as the candidate block based on the characteristics of the changed image blocks and/or changed image blocks of another processing cycle. According to one or more embodiments, it is too late to search a row once an image row hash list has been computed as the image data has already passed through the pipeline but a block immediately below the selected block may be employed given the fact that the changed image blocks typically cover multiple rows. In one embodiment, a subset (e.g., middle block) of a largest continuous section of the changed image blocks in a block row is selected as the candidate block. Then, the effective search area is identified for the candidate block. In another embodiment, a different block row is selected if the section of changed image block rows remains consistent with a previous block row but a previous search generated a lack of useful vector estimates. In yet another embodiment, multiple candidate blocks for each block row are selected. In some embodiments, because of sufficient processing resources, multiple and/or all candidate blocks are processed and the method 500 skips the selection of the effective search area.

At activity 512, the pixel offset hash list is generated for a current candidate block (i.e. the term "current" identifies the candidate block presently in the pipeline). In one embodiment, if vector estimation is constrained to vertical scroll detection and a rectangular search block is used, the pixel offset hash list comprises a set of hash values associated with a set of eight by eight blocks of pixels, each block offset from the previous block by one pixel row. In another embodiment, the pixel offset hash list for the effective search area comprises eight hash values spanning a vertical range of pixel offsets from −3 pixels to +4 pixels (including the zero offset location) from the candidate block. In this embodiment, the pixel offset hash value for a block with an offset of −3 pixels from the candidate block at a block row m aligns with a pixel offset hash value for a block with an offset of +4 pixels from a candidate block at a block row m−1. According to another embodiment, if a full motion search is performed, then the number of hash values computer is equal to the number of pixels in a block (e.g., in an eight by eight block, 64 hash values are computed). In other embodiments, other offset ranges are employed for convenience.

For example, in a pipelined embodiment, because it is inefficient to generate hash values for offset eight by eight blocks located above a candidate block, an offset of 0 to +7 pixels is employed for convenience. By limiting the pixel offset hash list to span one additional row, the number of offset hash values required for each candidate block is constrained but a search resolution of one pixel row (and one pixel column in the case of more general 2D motion estimation) is still provided. Moreover, a process implementation that only touches each image pixel once as it passes through the encoding system is disclosed. As described above, offsets of distances of greater than one image block row from a candidate block are identified by finding a match between a hash value in a pixel offset hash list and an aliased reference hash value in the reference list. This disclosure refers to a reference hash value in the reference list that is offset from the reference hash value at the corresponding location of an image block as an aliased reference hash value.

At activity 514, a motion or scroll vector estimate is computed by comparing a reference hash value and its aliases with hash values in the pixel offset hash list for the current candidate block. A set of matching blocks is recorded and a motion vector estimate is calculated using any of several means known to one of ordinary skill in the art. In one embodiment, a search distance is extended to any desired distance by comparing the reference hash values at different locations in the reference hash list with the pixel offset hash list. A method for computing the vector estimate for a vertical scroll embodiment is described by FIG. 6.

At step 516, a determination is made whether an end of frame has been reached. If the end of frame has not been reached, then the method 500 returns to step 506 and additional vectors may be estimated. If the end of frame has been reached, then the method 500 proceeds to step 518. For example, in one embodiment, other block rows are processed, following the input raster from top to bottom of the image frame.

At step 518, an end of method test is conducted (e.g., an input stream has ended). If the end of method test determines that the method 500 has not ended, then the method 500 proceeds to step 520 and then, returns to step 506. At step 520, the reference hash list is updated. The reference hash list (or a reference hash list in the case of multiple reference frames) is updated with hash values from the image hash list before the first row of a new frame is processed. If the end of method test determines that the method has ended, then the method 500 proceeds to step 522. At step 522, the method 500 ends.

In one embodiment, the method continues as long as the format of the input image remains unchanged. In one or more embodiments, the method 500 is terminated and restarted if the input image format changes (e.g. a resolution change) or if the input raster is interrupted. If an image with a different frame size is detected, a historic reference hash list may be used to generate vector estimates for the first frame under the assumption that a downstream decoder remains synchronized with a downstream encoder.

Figure 6:
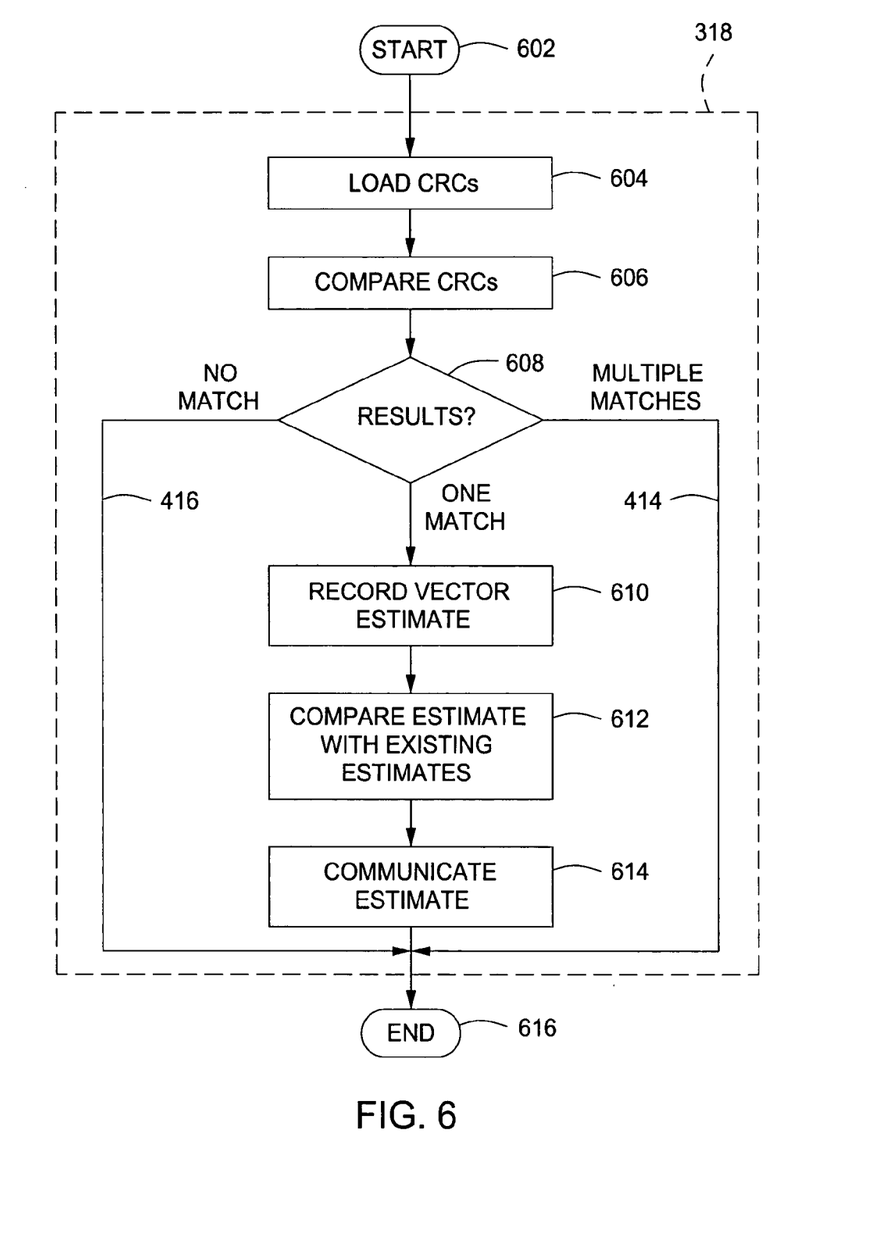
FIG. 6 is a flow diagram depicting an exemplary embodiment of a method for computing vertical scroll vector estimates.

FIG. 6 is a flow diagram depicting an exemplary embodiment of a method 600 for computing vertical scroll vector estimates. The method 600 begins at step 602 and proceeds to step 604. At step 604, the reference hash list and the pixel offset hash list for the current candidate block are loaded. Reference hash values from the reference hash list in locations covering the selected search area are chosen. Searches may be bounded by the edge of the frame or other search constraints such as knowledge of content or expected maximum vector length. In one embodiment, if a search starts in close proximity to a changed image block, then a first reference hash value is the reference hash value at the same coordinates as the current candidate block. In one embodiment, the number of comparisons is minimized by testing only high probability vector estimates such as those shown in Table 1.

TABLE 1

Examples of High Probability Vector Estimates

| Length | Direction | Example Motion Application |
|---|---|---|
| Long | Vertical | Vertical scroll or paging |
| Medium | Horizontal | Panning |
| Short | All | Window drag |

In one embodiment, if the historic information is available, an aliased reference hash is selected in proximity of an expected matching image pixel offset hash value. As an example, if a mouse wheel click is known to scroll three rows of standard text, a distance corresponding to three rows of text is tested. As another example, in a case where the dragging of a window is expected in the horizontal plane, a rectangular window of pixel offset hash values is tested.

Figure 7:
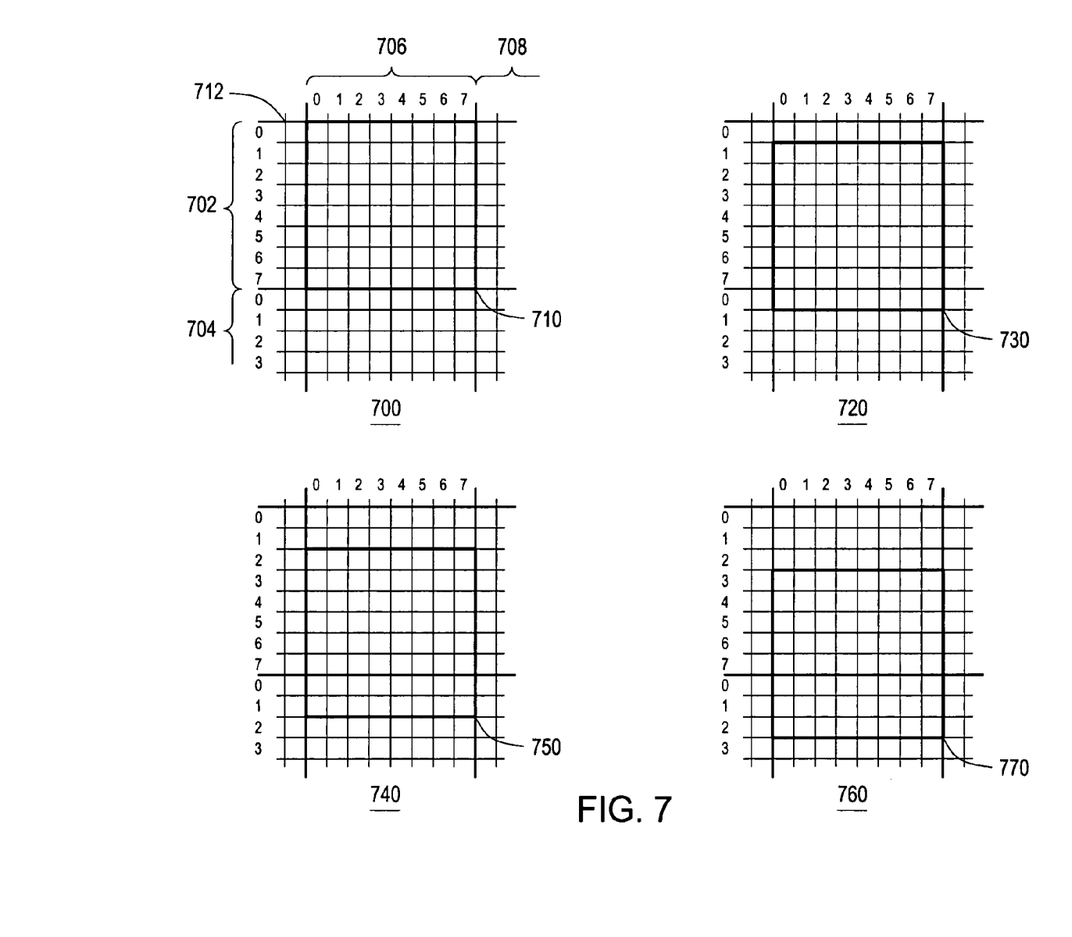
FIG. 7 is an illustration depicting a vertical search of an image frame in accordance with one or more embodiments.

At step 606, the reference hash values and their aliases are compared with the pixel offset hash list for the current candidate block. In one embodiment, the pixel offset hash list is compared with every loaded reference hash values. Refer to FIG. 7 for an illustration describing a vertical search embodiment.

At step 608, a determination is made whether the comparison at step 606 results in one match, multiple matches, and/or no match. If the comparison results in one match, the method 600 proceeds to step 610. At step 610, a vector estimate is recorded. At step 612, one or more comparisons are made with other estimates from previous searches to improve a confidence level of the vector estimate.

Various methods for improving the confidence level of vector estimates are contemplated. In one embodiment, the confidence level is increased each time a vector estimate matches a previous vector estimate from a different candidate block. A vector estimate that generates a greatest number of matches provides a highest confidence level. In another embodiment, a vector estimate found for the current candidate block and also used successfully in the downstream encoding of blocks in proximity to the current candidate block is assigned a high confidence level. In another embodiment, the confidence level for a vector estimate match is lowered for decreased proximity to the current candidate block. In another embodiment, multiple candidate blocks are selected for each image block row and the confidence level is increased for multiple matches. If multiple matches are not confirmed by other estimates, they are discarded.

At step 614, one or more vector estimates are communicated to the image encoder 115 or another component of the encoding system 112. In one embodiment, a confidence level associated with each estimate is also communicated.

If the comparison results in multiple matches, the vectors are discarded and the method 600 proceeds to step 616. For example, multiple matches occur when comparing images such as a blank background with insufficient features to create unique hash values. At step 616, method 600 ends.

If the comparison results in no matches, no vector is recorded and the method 600 proceeds to step 616. At step 616, method 600 ends.

FIG. 7 is an illustration depicting a vertical search of an image frame 712 in accordance with one or more embodiments. In one embodiment, the Image frame 712 further includes a block row 702, a block row 704, a block column 706, and a block column 708. The candidate block 710 overlays the block defined by an intersection of the block row 702 and the block column 706. The pixel offset hash list, as described above in various embodiments, comprises eight hash values where each hash value is associated with a block offset from the candidate block 710 by a different vertical offset.

The vertical search begins at iteration 700. At iteration 700, a zero pixel offset hash value is computed for the candidate block 710 of the image frame 712 and stored as a first entry in a pixel offset hash list. The zero pixel offset hash value generates a null vector estimate reflecting no image block change for that comparison. Then, the vertical search proceeds to iteration 720.

At iteration 720, a one pixel offset hash is computed for a block 730 at +1 pixel row offset from the candidate block 710 of the image frame 712 and stored as a second entry in the pixel offset hash list. Then, the vertical search proceeds to iteration 740.

At iteration 740, a two pixel offset hash is computed for a block 750 at +2 pixel rows offset from the candidate block 710 of the image frame 712 and stored as a third entry in the pixel offset hash list. Then, the vertical search proceeds to iteration 760.

At iteration 760, a three pixel offset hash is computed for a block 750 at +3 pixel rows offset from the candidate block 710 of the image frame 712 and stored as a fourth entry in the pixel offset hash list.

In one embodiment, iterations of the vertical search of the image frame 712 continue until eight pixel offsets hash values are computed. During the hash value comparison computation, a different hash value from the pixel offset hash list is loaded for each comparison including the last four offsets not shown in FIG. 7.

Figure 8:
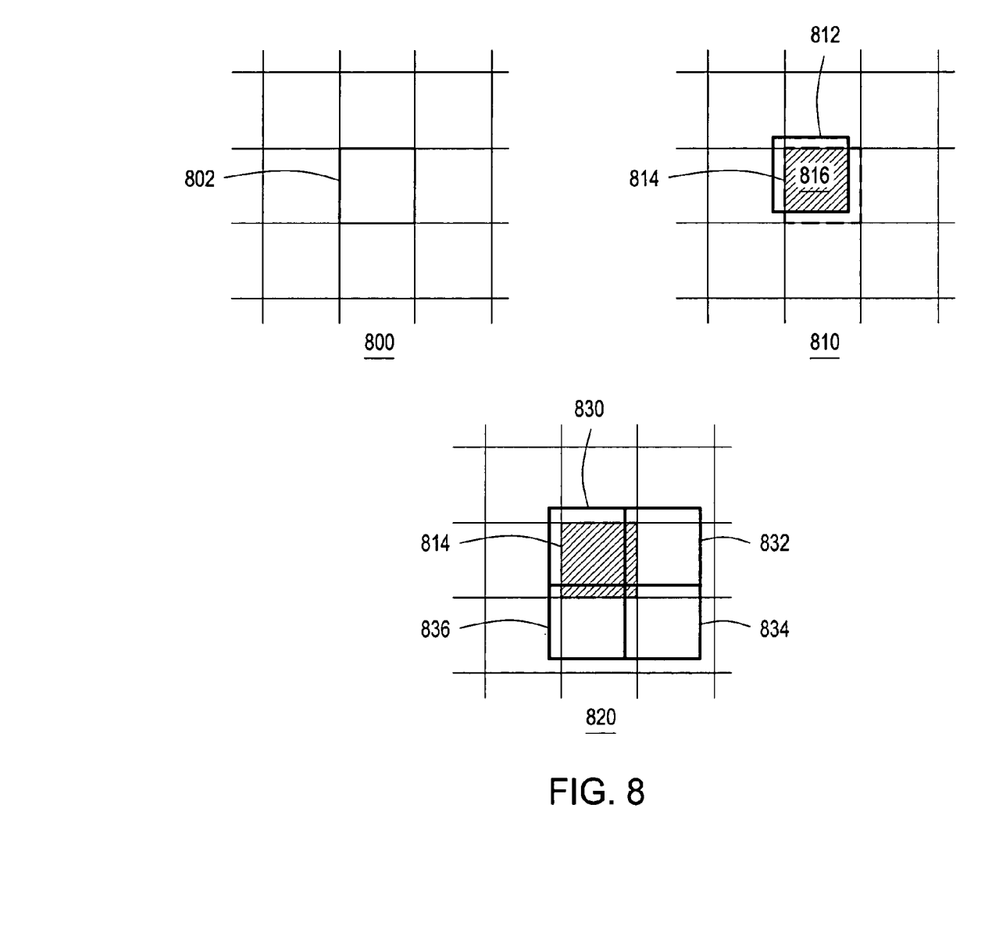
FIG. 8 is an illustration depicting a validated effective search area in accordance with one or more embodiments.

FIG. 8 is an illustration depicting a validated search area in accordance with one or more embodiments. Validation of a search area begins at iteration 800 with a reference frame 801. The reference frame 801 includes a reference block 802. The reference block 802 may be aliased, non-aliased, or a matching block at a different location according to one or more embodiments. At iteration 800, a hash value for a zero pixel offset of the reference block 802 is computed and stored as a first entry in a pixel offset hash list.

At iteration 810, a hash value for an offset block 812 is computed and stored as a second entry in the pixel offset hash list. A vector estimate is calculated and/or recorded based on a match between hash values of the offset block 812 and the reference block 802. A perfect match, however, between a candidate block 814 and an area of the reference frame 801 cannot be assumed. In fact, the only pixels of a candidate block 814 that can be assumed to match reference block 802 are the pixels in shaded region 816. The un-shaded region of the candidate block 814 represents pixels not confirmed to match any pixels of the reference frame 801.

At iteration 820, the vector estimate is validated by confirming multiple matches of the candidate block 814 using offset blocks 830, 832, 834, and 836. The offset blocks 830, 832, 834, and 836 envelop the candidate block 814 (e.g., in the shape of a box). A match is confirmed for the candidate block 814 when hash values of each of the offset blocks 830, 832, 834, and 836 matches a corresponding block of the reference frame 801. Hence, the performance of iteration 820 enables confirmation of all the pixels of the candidate block 814.

Figure 9:
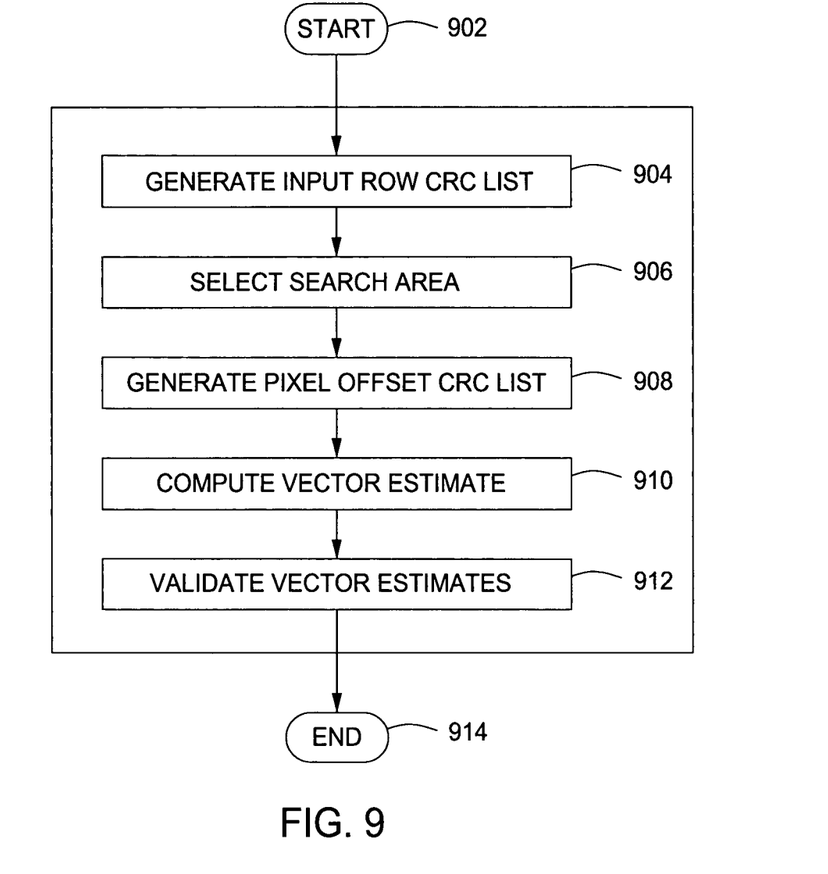
FIG. 9 is a flow diagram depicting an exemplary embodiment of a method for validating motion vector estimates.

FIG. 9 is a flow diagram depicting an exemplary embodiment of a method 900 for validating motion vector estimates. Validated motion vectors may then be used as motion vectors by an external system (e.g., the client 108 of FIG. 1) such that no further motion search processing of a pixel region associated with the validated motion vectors is required.

The method 900 begins at step 902 and proceeds to step 904. At step 904, an image row hash list is generated, as illustrated in FIG. 5. At step 906, an effective search area is selected, as illustrated in FIG. 5. In one embodiment, the search area is selected by a motion (e.g., a pan, a scroll, a windows drag, etc.). At step 908, a pixel offset hash list is generated, as illustrated in FIG. 5. At step 910, a vector estimate is computed, as illustrated in FIG. 5. In one embodiment, the vector estimate is computed by comparing hash corresponding hash values of the image row hash list and the pixel offset hash list.

At step 912, the vector estimates are validated. In one embodiment, vector estimates from previously processed block rows used for validation enables processing of the image frame in a single pass through the pipeline without storing or retrieving the data multiple times. In another embodiment, the vector estimate is validated by surrounding the candidate block with offset blocks such that all of the pixels of the candidate block fall within the offset blocks. In yet another embodiment, a confirmed motion vector is recorded if a first plurality of hash values associated with a plurality of adjacent search areas matches a portion of the reference list of hash values of adjacent pixel areas of the reference frame. The method 900 proceeds to step 914, where the method 900 ends.

Figure 10:
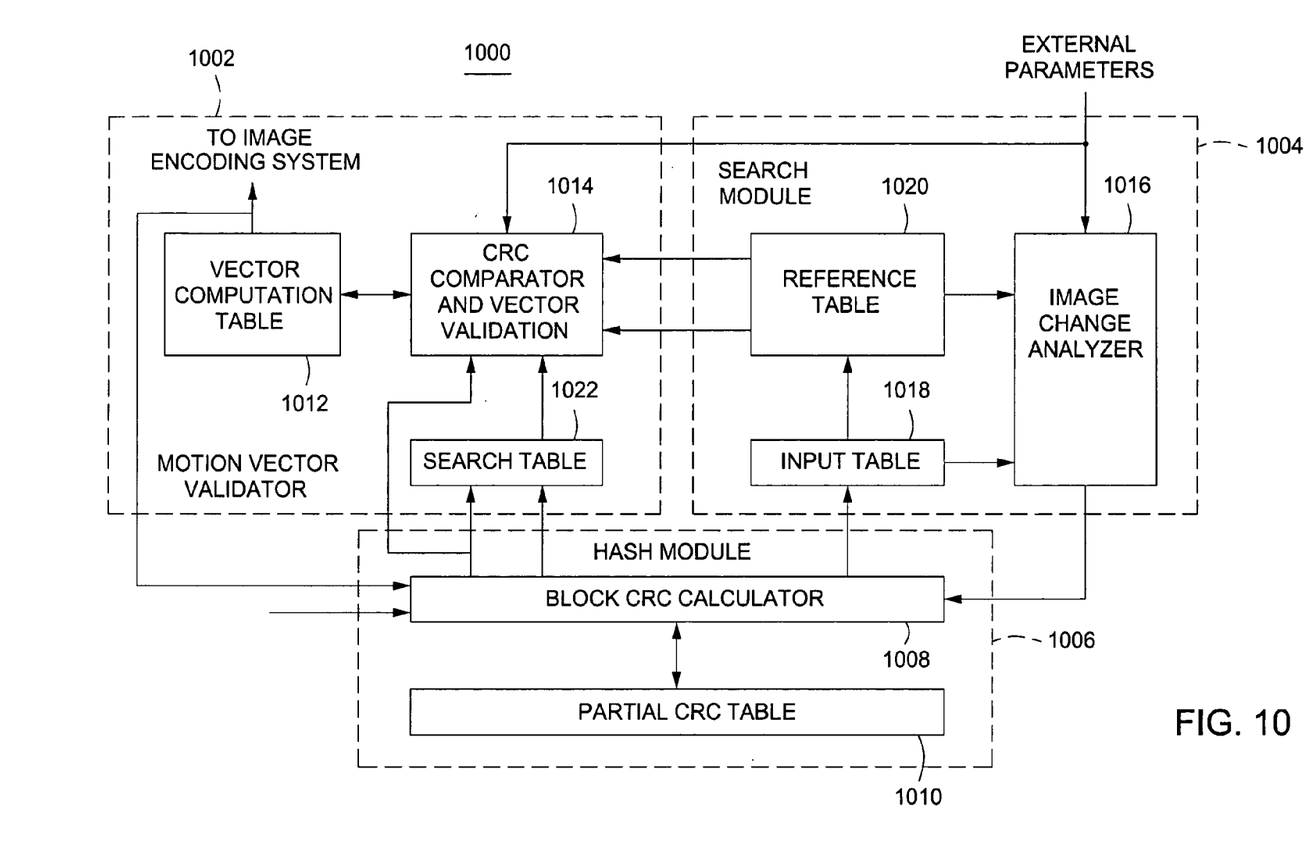
FIG. 10 is a block diagram of an exemplary embodiment of an apparatus for encoding an image including a motion vector validator.

FIG. 10 is a block diagram of an exemplary embodiment of an apparatus 1000 for encoding an image having a motion vector validator 1002. The apparatus 1000 for encoding an image is an alternative embodiment of the apparatus 200 for encoding an image of FIG. 2, described above. In one embodiment, the encoding system 112 includes the motion vector validator 1002 and the image encoder 115, which are utilized on images created by the GPU 110 of FIG. 1. Motion vector estimates are validated by the motion vector validator 1002 and then forwarded to the image encoder 115. The apparatus 1000 for encoding an image also includes a search module 1004, and a hash module 1006, each coupled to each other through transmission mediums (e.g., signal paths, wires, etc.).

The hash module 1006 includes a block CRC calculator 1008 (e.g., the block CRC calculator 206 as illustrated in FIG. 2) that is coupled to a partial CRC table 1010 (e.g., the partial CRC table 208 as illustrated in FIG. 2). The block CRC calculator 1008 receives bitmapped image data (e.g. pixels) as input and generates block CRC values (i.e., hash values), as illustrated in FIG. 2.

The search area module 1004 includes an image change analyzer 1016 (e.g., the image change analyzer 210 as illustrated in FIG. 2), an image table 1018 (e.g., the image table 212 as illustrated in FIG. 2), and a reference table 1020 (e.g., the reference table 214 as illustrated in FIG. 2). The image change analyzer 1016 compares an image row CRC list with a reference row CRC list associated with a same row. The change analyzer 1016 then determines a candidate block, as illustrated in FIG. 2.

The motion vector validator 1002 includes a search table 1022, a vector computation table 1012, and a CRC comparator/vector validation 1014. In one embodiment, the hash module 1006 through the block CRC calculator 1008 also generates pixel offset CRC lists over the whole image frame using current vector estimates stored in a vector computation table 1012. In another embodiment, the CRC comparator/vector validator 1014 is included in the motion vector estimator 114. In yet another embodiment, the CRC comparator/vector validator 1014 is included in the image encoder 115.

The CRC comparator/vector validation sub-system 1014 compares pixel offset CRC lists for candidate blocks with reference CRC values and aliases as described for the CRC comparator/vector estimation sub-system 220 in FIG. 2. In one embodiment, the sub-system 1014 also compares reference CRC values retrieved from the reference table 1020 with pixel offset CRC lists generated by block CRC calculator 1080 for a group of image blocks that surround the candidate block previously identified as vector estimates. The pixel offset CRC lists are communicated to the sub-system 1014 and the search table 1022.

Once CRC comparisons for a frame are complete and all matches have been recorded, validated vector estimates are identified and flagged (e.g. a validation mask for each candidate block in which all pixels have been confirmed). Vector computation table 1012 stores enveloping match information which is used for block comparisons.

When all the pixels from an image block have been tested and confirmed to either match or not match a defined vector estimate, the match status information is communicated to the image encoder 115 or another component of the encoding system 112. In one embodiment, image blocks that match all pixels require no further image processing from the encoding system 112.

While the foregoing is directed to embodiments of the present invention, other and further embodiments of the invention may be devised without departing from the basic scope thereof, and the scope thereof is determined by the claims that follow.

What is claimed is:

1. A method of determining a motion vector, comprising:
    partitioning all pixels of a reference image into a plurality of non-overlapping blocks, each non-overlapping block of the plurality of non-overlapping blocks having first pixel dimensions;
    generating, by a computer comprising one or more processors, a reference hash list comprising a reference hash value for each non-overlapping block of the plurality of non-overlapping blocks;
    partitioning an input image into a plurality of overlapping blocks comprising all possible block positions of blocks of the first pixel dimensions;
    generating, by the computer, a plurality of input hash values, wherein the plurality of input hash values comprises an input hash value for each overlapping block of the plurality of overlapping blocks;
    generating, for each reference hash value, of the reference hash list, that matches only one of a spatially associated selection of input hash values of the plurality of input hash values, a pixel offset to generate a pixel offset list, wherein the pixel offset is a spatial offset between the each reference hash value and the only one of the spatially associated selection, and wherein the pixel offset list is generated by using only the reference hash list as a reference to the reference image; and
    encoding the input image using a most common pixel offset of the pixel offset list as a motion vector estimate.

2. The method of claim 1, wherein encoding the input image comprises matching at least two reference hash values of the reference hash list to at least two input hash values of the plurality of input hash values to confirm a first image block of the input image matches a first reference block of the reference image, the first image block having the first pixel dimensions and comprising a portion of pixels of at least two of the plurality of overlapping blocks associated with the at least two input hash values, wherein the at least two of the plurality of overlapping blocks and at least two of reference blocks associated with the at least two reference hash values comprise a common spatially adjacent arrangement.

3. The method of claim 1, wherein a pixel value of the input image is used in generating a number of the input hash values, the number equal to a pixel width of the first pixel dimensions times a pixel height of the first pixel dimensions, and wherein at least one of the pixel width or the pixel height is at least eight pixels.

4. The method of claim 1, wherein encoding the input image comprises a fixed partitioning of encoded images into non-overlapping encoded blocks of matching pixel dimensions; and identifying all of the non-overlapping encoded blocks that match pixel values of the reference image, wherein the pixel values are offset by the motion vector estimate.

5. The method of claim 4, wherein encoding the input image comprises identifying an unchanged non-overlapping encoded block if a corresponding input hash value of the input hash values matches a spatially common reference hash value of the reference hash list.

6. The method of claim 4, wherein the matching pixel dimensions comprise at least one of the first pixel dimensions or one pixel dimension of at least 8 pixels.

7. The method of claim 1, wherein the spatially associated selection of the input hash values is selected based on a defined search area and is exclusive of a null motion vector.

8. The method of claim 1, further comprising repeated encodings of updates to the input image, wherein each encoding of the repeated encodings comprises identifying a single motion vector estimate as an only motion vector.

9. The method of claim 1, wherein encoding the input image comprises using at least two input hash values to confirm a block having the first pixel dimensions matches a non-aliased block of the reference image.

10. The method of claim 1, wherein the pixel offset list comprises information from at least one of previous motion vector estimates or hints from rendering of the input image.

11. The method of claim 1, wherein matching only one of the spatially associated selection of input hash values comprises determining matches between one reference hash value of the reference hash list and more than one of the plurality of input hash values, and ignoring the one reference hash value in generating the pixel offset list.

12. The method of claim 1, wherein the motion vector estimate identifies a spatial displacement between a first non-overlapping block of the plurality of non-overlapping blocks and a first overlapping block of the plurality of overlapping blocks.

13. The method of claim 1, wherein encoding the input image comprises encoding the motion vector estimate and an identification of an input portion, the input portion comprising a selection of non-overlapping common dimension blocks of the input image matching an equivalent portion of the reference image at a pixel offset vector defined by the motion vector estimate, wherein the first pixel dimensions and the non-overlapping common dimension blocks each comprise a size of at least eight pixels in one dimension.

14. The method of claim 1, wherein the reference image and the input image are each partitioned into rows and columns of blocks of the first pixel dimensions.

15. The method of claim 1, wherein the first pixel dimensions are fixed and known by a decoder.

16. An apparatus for encoding an image comprising:
    at least one processor enabled to generate an input image and a reference image; and
    an encoder, coupled to the at least one processor, comprising:
        a block hash code calculator enabled to generate (i) a reference hash list comprising reference hash values from reference blocks generated by spatially partitioning the reference image into a maximum number of unique non-overlapping blocks of a common size and (ii) a plurality of input hash values from input blocks generated by spatially partitioning the input image into a maximum number of unique overlapping blocks of the common size;

memory enabled to store portions of both the reference hash values and the plurality of input hash values;

a motion vector estimator for generating, for each reference hash value of the reference hash list that matches only one of a spatially associated selection of input hash values of the plurality of input hash values, a pixel offset to generate a pixel offset list, wherein the pixel offset is spatial offset between the each reference hash value and the only one of the spatially associated selection, and wherein the pixel offset list is generated by using only the reference hash list as a reference to the reference image; and an image encoder enabled to encode the input image using a most common pixel offset of the pixel offset list as a motion vector estimate.

* * * * *